United States Patent [19]

Nelson

[11] Patent Number: 4,512,966

[45] Date of Patent: Apr. 23, 1985

[54] HYDRIDE PRODUCTION AT MODERATE PRESSURE

[75] Inventor: Gunner E. Nelson, Baton Rouge, La.

[73] Assignee: Ethyl Corporation, Richmond, Va.

[21] Appl. No.: 557,206

[22] Filed: Dec. 2, 1983

[51] Int. Cl.$^3$ .............................................. C01B 6/26
[52] U.S. Cl. ................................................... 423/644
[58] Field of Search ......................................... 423/644

[56] References Cited

U.S. PATENT DOCUMENTS

| | | | |
|---|---|---|---|
| 2,576,311 | 11/1951 | Schlesinger et al. | 423/644 |
| 3,104,252 | 9/1963 | Rodd et al. | 260/448 |
| 3,355,262 | 11/1967 | Beaird et al. | 423/644 |
| 3,505,036 | 4/1970 | Lindsay | 423/644 |
| 3,556,740 | 1/1971 | Murib | 23/365 |
| 4,010,248 | 3/1977 | Nelson | 423/644 |
| 4,045,545 | 8/1977 | Ashby | 423/644 |
| 4,081,524 | 3/1978 | Ashby | 423/644 |

FOREIGN PATENT DOCUMENTS

| | | | |
|---|---|---|---|
| 756510 | 4/1967 | Canada | 423/644 |
| 1185707 | 3/1970 | United Kingdom | 423/644 |

OTHER PUBLICATIONS

Ashby, E. C., et al., *Inorganic Chemistry*, 2, 499 (1963), pp. 499–504.
Socha, A. J., et al., Analysis of Aluminum Powder, 1964, pp. 1–5 and i–vi.
Alcoa Atomized Powders, 1968.
Alcoa Aluminum Powder, 1969.
Ashby, E. C., et al., *Inorganic Chemistry*, 5, 1615 (1966), pp. 1616–1617.

*Primary Examiner*—Herbert T. Carter
*Attorney, Agent, or Firm*—Donald L. Johnson; John F. Sieberth; John F. Hunt

[57] ABSTRACT

An effective two stage process for the production of sodium aluminum tetrahydride which facilitates use of equipment at moderate hydrogen pressure of 700–1500 psig. An aluminum alkyl is added to provide a catalyst species in a hydrocarbon reaction medium containing aluminum and sodium reactants. A reaction at about 130°–170° C. is carried out to form $Na_3AlH_6$. The reaction temperature is then lowered to about 80°–120° C. and the hydrogen pressure is continued to convert the $Na_3AlH_6$ to $NaAlH_4$.

25 Claims, 1 Drawing Figure

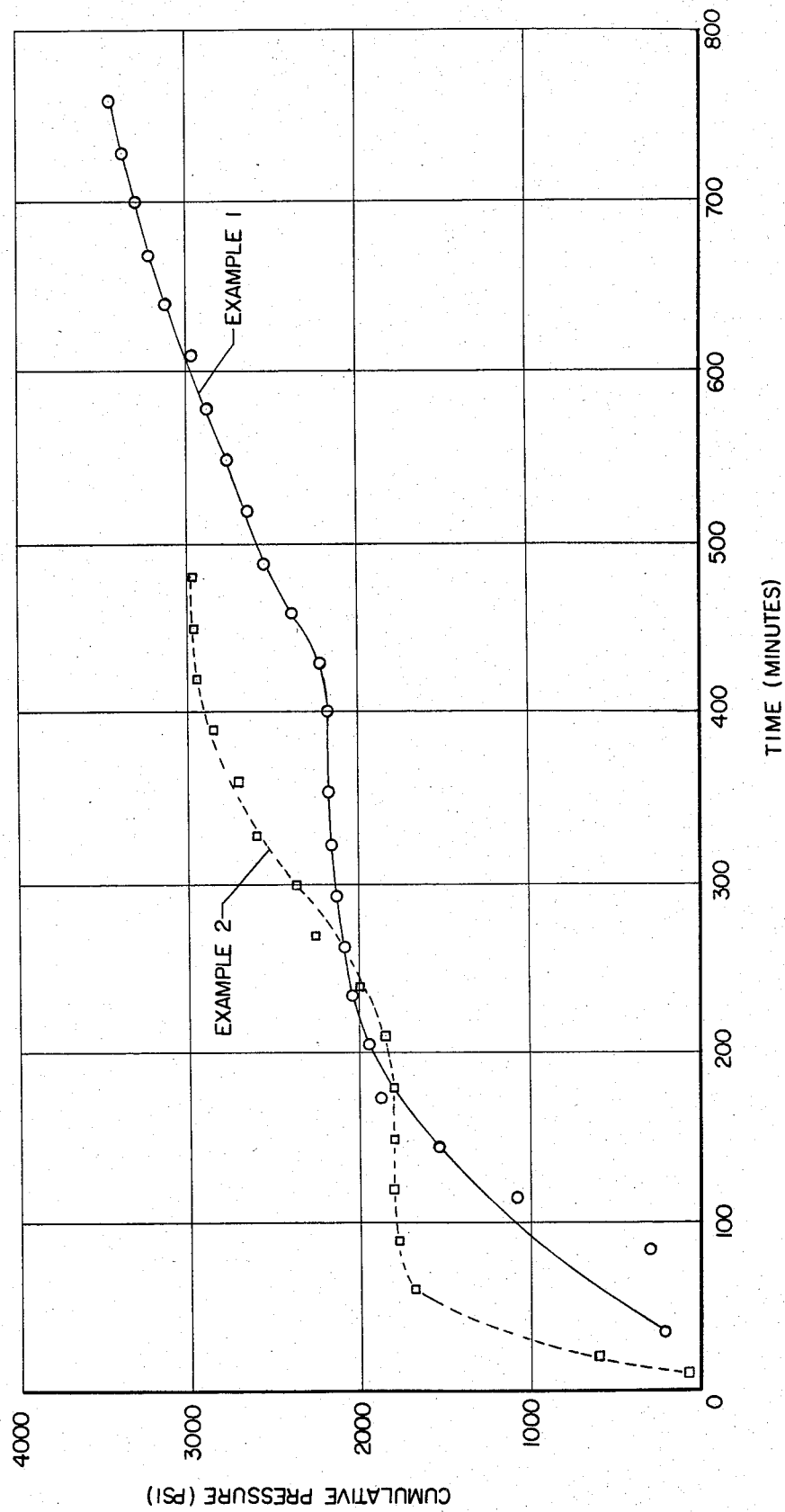

HYDRIDE PRODUCTION AT MODERATE PRESSURE

BACKGROUND OF THE INVENTION

I. Field of the Invention

This invention relates in general to complex metal hydrides and their synthesis, and in particular to a process which permits production of sodium aluminum tetrahydride at relatively moderate pressure.

II. Description of the Prior Art

Various processes have been proposed for making alkali metal aluminum hydrides in both hydrocarbon and other solvents from alkali metal hydrides and from the elements.

Several processes are known for the production of complex metal hydrides in ether solvents. The use of ether solvents has many disadvantages however. Sodium aluminum tetrahydride tends to undergo dangerous thermal decomposition in ethers like tetrahydrofuran (THF), the dimethyl ether of ethylene glycol (monoglyme), or the dimethyl ether of diethyleneglycol (diglyme).

The commercial grade ethers must be purified to remove water, alcohols, and explosive peroxides and hydroperoxides before use. Also, long-term storage of ether permits deterioration (ether cleavage) which affects reactions in which it is used. Finally, besides the inherent danger of ethers, their cost is much greater than hydrocarbon solvents which are innocuous to the reaction of the present invention.

Efficient process to make sodium aluminum tetrahydride at very high pressures of 2000 psig or more have been developed. There exists a need however for an economical process with relatively rapid throughput at relatively moderate pressures.

If the production of hydrides can be achieved at moderate reaction pressures, then the process is made available (a) to locations where higher pressures are not permitted; (b) in less expensive equipment adapted only for moderate pressure limits; and (c) in older equipment which, though previously rated for high pressures, is currently because of wear or age suitable for only moderate pressures.

The alkali metal aluminum tetrahydrides, including sodium aluminum tetrahydride, are well known reducing agents for chemical synthesis and have other utilities well known to those skilled in the art. The alkali metal aluminum tetrahydrides may also be used to reaction with various silicon-containing compounds to produce precursors to high purity silicon, e.g. silane. The production of sodium aluminum tetrahydride is quite small and there is only one major producer in the world.

CROSS-REFERENCE

Reference is made to the following related co-pending applications.
Ser. No. 450,032, Filed Dec. 15, 1982
Ser. No. 490,791, Filed May 2, 1983
Ser. No. 496,466, Filed May 20, 1983
Ser. No. 457,897, Filed Jan. 14, 1983
Ser. No. 496,474, Filed May 20, 1983

The first four applications listed above are filed in my name and all five applications are commonly assigned.

SUMMARY OF THE INVENTION

Reaction among sodium or sodium hydride (NaH), aluminum, and hydrogen may be effected at low temperature, e.g. 100° C. and moderate pressure but very long reaction times, e.g. twenty hours are required to make sodium aluminum tetrahydride.

Reaction among sodium or sodium hydride, aluminum, and hydrogen at moderate pressure and elevated temperature, e.g. 160° C. results in only trisodium aluminum hexahydride, $Na_3AlH_6$. The use of $Na_3AlH_6$ is not economically feasible in most processes because of the high throughput of sodium per quantity of hydrogen.

The present invention is directed to an advantageous process to provide alkali metal aluminum tetrahydride, particularly sodium aluminum tetrahydride in a process using moderate pressure. The process provides a relatively rapid throughput of elemental reactants (or NaH where elemental sodium is not used) while using a system at moderate pressure to provide high yields of sodium aluminum tetrahydride. The invention facilitates production where higher pressures, e.g. 2000 psig or higher, are not permitted or advisable for safety or other reasons. The invention also facilitates production of sodium aluminum tetrahydride in less expensive equipment (which may already be in use for other processes) and in older equipment which has been downgraded to a lower pressure rating.

The present invention is a two stage process for the production of $NaAlH_4$, said process comprising the steps of:
(a) pressure hydrogenating sodium or sodium hydride with aluminum in a hydrocarbon reaction medium at about 700–1500 psig at 130°–170° C. in the presence of a catalyst provided by adding an aluminum alkyl, so as to form $Na_3AlH_6$;
(b) then reducing the temperature to 80°–120° C. while continuing pressure hydrogenation so as to convert the $Na_3AlH_6$ to $NaAlH_4$; and
(c) recovering $NaAlH_4$.

The present invention is also a two stage process for the production of sodium aluminum tetrahydride, said process comprising the steps of:
(a) effecting reaction among sodium or sodium hydride, aluminum, and hydrogen at a pressure of about 1000 psig and a temperature of about 140° C. in toluene in the presence of $Na(CH_3CH_2)_2AlH_2$ catalyst formed from 10 or more mole percent triethylaluminum based on the moles of sodium, so as to form trisodium aluminum hexahydride;
(b) then reducing the temperature to about 100° C. while continuing the hydrogen at pressure so as to convert the trisodium aluminum hexahydride to sodium aluminum tetrahydride; and
(c) recovering sodium aluminum tetrahydride.

BRIEF DESCRIPTION OF THE DRAWING

The drawing FIGURE is a graphical representation of the two step process of the invention as detailed in the Examples below. The plot of Example 1 represents the use of fresh catalyst (prepared in situ) and the plot of Example 2 represents the use of recycled catalyst.

DESCRIPTION OF THE PREFERRED EMBODIMENT

The invention is carried out in two stages. While certain one step, high pressure processes may also provide good results, the present invention is carried out at moderate pressure in two different temperature ranges to provide an excellent yield of sodium aluminum tetrahydride. In the first stage, reaction is effected among sodium, aluminum, and hydrogen at moderate pressure of 700–1500 psig preferably about 700–1300 psig, more preferably about 1000 psig, and at about 130°–170° C. preferably about 130°–150° C., more preferably about 140° C., to form trisodium aluminum hexahydride, Na$_3$AlH$_6$. While Na$_3$AlH$_6$ is itself a usable reducing agent, it requires a higher weight throughput than NaAlH$_4$ for the amount of chemical activity related to the hydrogen atoms. Thus NaAlH$_4$ production is a more desirable product and may be achieved according to the invention by, in the second stage, continuing to provide hydrogen at moderate pressure while holding the reaction temperature at a second range of about 80°–120° C. preferably about 90°–110° C., more preferably about 100° C.

The entire reaction is usually complete in about five to twelve hours with good agitation, e.g. 750 RPM in large equipment. The first stage requires about one to five hours depending on the size and type of equipment, catalyst type, and catalyst amount.

While hydrogen pressure only is the preferred embodiment of the invention, inert gases may be used to supply some of the pressure so long as a large proportion of hydrogen pressure is used to effect the reaction. A small nitrogen content often remains from a purge of the system.

A catalyst is used for the process of the invention. The time for each stage and for the overall reaction varies according to the choice of catalyst, amount of catalyst used, and reaction medium.

Catalyst materials of the invention are the metal alkyls, preferably aluminum alkyls. Preferred aluminum alkyls are triethylaluminum, triemethylaluminum, triisobutylaluminum, diethylaluminum hydride, triisopropylaluminum, and the like. Triethylaluminum is most preferred. In most instances, the catalyst material is added and a catalyst species is formed to catalyze the reaction. For example, when 7.5 mole percent (on sodium) triethylaluminum is added to the reactants in toluene, Na(CH$_3$CH$_2$)$_2$AlH$_2$ is formed.

The catalyst should be present in about five mole percent or more, preferably 10 mole percent or more, based on sodium.

The aluminum of the invention is preferably of the type which contains a reaction-promoting amount of any of certain metals now found to be effective. Suitable metals are titanium, zirconium, hafnium, vanadium, niobium, and uranium, titanium being preferred. A suitable range for the reaction-promoting quantity of metal is about 300–2500 parts by weight per million parts aluminum. A preferred range is 450–2000 ppm. More preferred is 1000–2000 ppm. While the upper point of diminishing return has not been determined, excellent results are obtained with 1900 ppm titanium as found in Reynolds aluminum designated as I-783.

The reaction medium of the invention must be carried out in either a tertiary amine or stable aliphatic-/aromatic hydrocarbon portion. Thus any of the well known hydrocarbon reaction mediums such as toluene, hexane, heptane, trimethylpentane, xylene and the like are suitable for the invention, toluene being preferred.

Suitable tertiary amine reaction mediums include triethylamine, triisopropylamine, tri-n-butylamine, dimethylaniline, or tetramethyl ethylenediamine.

It may be advantageous in some cases to use another reaction medium mixed with the hydrocarbon. This may be desirable where THF, methyl THF or another ether is to be used in a subsequent reaction using the NaAlH$_4$ and a solvent recycle system is employed. I have found that 75 percent tetrahydrofuran (THF) on a weight basis and 25 percent toluene will contain 11.3 weight percent NaAlH$_4$.

A better understanding of the two stage process of the invention will be had by reference to the following examples which are the best mode of the invention now known to me.

EXAMPLE 1

The inventive two step process was carried out in a 400 gallon reactor having a pressure rating of about 1200 psig. Hydrogen pressure was supplied at 1000 psig and the hydrogen consumption was monitored with time to determine the progress of the reaction. About 420 pounds (8283 moles) molten sodium, 500 pounds (8400 moles) aluminum (Reynolds I-783), 1400 lbs. toluene, and 170 lbs. triethylaluminum (9.3 mole % on reactant Na) were charged to the reactor and the reactor was sealed. The reactor was purged with nitrogen and supplied with hydrogen to 1000 psig, then sealed at that pressure with heating at 140° C. After four hours and 30 minutes the hydrogen uptake ceased. X-ray diffraction analysis revealed Na$_3$AlH$_6$.

The reactor temperature was then lowered to about 100°–110° C. whereupon hydrogen uptake again began and continued, dropping off gradually as the reactants were depleted, for about another six hours. The product wet cake was soluble in diglyme and other analysis confirmed the conversion of the intermediate Na$_3$AlH$_6$ to NaAlH$_4$.

After the toluene was decanted from the NaAlH$_4$ wet cakes, about 30 volume percent of the toluene and catalyst remained trapped in the wet cake. Washing with another volume of toluene results in a catalyst recovery of about 85%. Yield based on aluminum is about 91%. A small portion of the aluminum reactant is used to form the catalyst species. Notice that 10 mole percent triethyl aluminum results in about 15 mole percent of the catalyst species NaAl(C$_2$H$_5$)H$_2$. That species can be recovered by precipitation from cooling the toluene slightly. In laboratory equipment, the entire reaction sequence was complete in about five hours where fresh triethylaluminum catalyst was used. In subsequent laboratory equipment runs with recycled catalyst, there was some deterioration of catalyst activity especially where the catalyst had been stored. In runs using the 400 gallon reactor, the overall reaction time was about ten to twelve hours regardless of whether fresh catalyst material (as opposed to recycled catalyst) was used. The overall yield was 86% on sodium and 747 lbs. NaAlH$_4$ were recovered.

EXAMPLE 2

The process equipment of Example 1 was used. Reaction in the 400 gallon reactor vessel among sodium, aluminum, and hydrogen at 1000 psig and at 145° C. using recycled catalyst of the same concentration as provided by 10 mole percent fresh triethylaluminum based on sodium resulted in formation of Na$_3$AlH$_6$ only. The hydrogen consumption fell off sharply after about sixty minutes and ceased after 90 minutes total. The hydrogen pressure was maintained at about 1000 psig and the reactor temperature was maintained at 145° C. for 90 additional minutes but no further hydrogen uptake occurred. The results of this example are plotted against the results of Example 1 in the drawing Figure.

Furthermore, laboratory comparisons at 140° C. only and higher catalyst amounts gave similarly poor hydrogen uptake without producing NaAlH$_4$.

After the 90 minute hiatus, the temperature was lowered and the reaction continued to completion according to the invention in another three hours and thirty minutes. The conversion was 84% on sodium and 737 lbs. NaAlH$_4$ were recovered.

In a run similar to Examples 1 and 2 but conducted in laboratory scale equipment with reduced but substantially stoichiometric portions of reactants, a pressure hydrogenation was carried out at 1000 psig using about 5 mole percent triethylaluminum (on sodium). The reaction temperature was maintained at 140° C. and Na$_3$AlH$_6$ readily formed in about 160 minutes. Thereafter the reaction slowed considerably and hydrogen uptake ceased and did not restart through a total of seven hours at 140° C. and 1000 psig H$_2$. Only Na$_3$AlH$_6$ was formed as detected by x-ray diffraction and other analyses.

Thus, the unexpected result from lowering the temperature according to the invention is readily seen by comparison of the central horizontal portions of the plots of Examples 1 and 2.

It will now be clear to the skilled artisan that the invention may be varied considerably in its practice without departing from its lawful scope and true spirit.

I claim:

1. A two stage process for the production of NaAlH$_4$, said process comprising the steps of:
   (a) pressure hydrogenating sodium or sodium hydride with aluminum in a tertiary amine or hydrocarbon reaction medium at about 700-1500 psig at 130°-170° C. in the presence of a catalyst provided by adding an aluminum alkyl, so as to form Na$_3$AlH$_6$; and
   (b) then reducing the temperature to 80°-120° C. while continuing pressure hydrogenation so as to convert the Na$_3$AlH$_6$ to NaAlH$_4$ at a substantially increased reaction rate compared to the reaction rate at the previous temperature.

2. The process of claim 1 wherein the aluminum alkyl catalyst is soluble in the reaction medium.

3. The process of claim 2 wherein the aluminum alkyl is added in the amount of 10 or more mole percent base on sodium.

4. The process of claim 1 wherein the process is carried out in the additional presence of an ether reaction medium.

5. The process of claim 4 wherein said ether medium is tetrahydrofuran or methyl tetrahydrofuran.

6. The process of claim 1 wherein the reaction medium is a tertiary amine.

7. The process of claim 6 wherein the tertiary amine is a trialkylamine.

8. The process of claim 7 wherein the trialkylamine is triethylamine.

9. The process of claim 1 wherein the reaction medium is an aliphatic or aromatic hydrocarbon.

10. The process of claim 9 wherein said hydrocarbon reaction medium is an aromatic hydrocarbon.

11. The process of claim 10 wherein said aromatic hydrocarbon is toluene.

12. The process of claim 1 wherein the aluminum alkyl is triethyl aluminum.

13. The process of claim 12 wherein the catalyst comprises Na(C$_2$H$_5$)$_2$AlH$_2$.

14. The process of claim 1 wherein the aluminum alkyl is trimethyl aluminum.

15. The process of claim 1 carried out at about 1000 psig.

16. The process of claim 1 wherein the Na$_3$AlH$_6$ is formed at about 140° C.

17. The process of claim 16 wherein the NaAlH$_4$ is formed at 100° C.

18. The process of claim 1 wherein the Na$_3$AlH$_6$ is converted to NaAlH$_4$ at 100° C.

19. The process of claim 1 wherein the aluminum reactant contains a reaction-promoting quantity of a metal selected from titanium, zirconium, hafnium, vanadium, niobium, or uranium.

20. The process of claim 19 wherein the selected metal is titanium.

21. The process of claim 20 wherein the reaction promoting amount is about 1900 parts by weight per million parts aluminum.

22. A two stage process for the production of sodium aluminum tetrahydride, said process comprising the steps of:
   (a) effecting reaction among sodium or sodium hydride, aluminum, and hydrogen at a pressure of about 1000 psig and a temperature of about 140° C. in toluene in the presence of Na(CH$_3$CH$_2$)$_3$AlH$_2$ catalyst formed from about 10 or more mole percent triethylaluminum based on the moles of sodium, so as to form trisodium aluminum hexahydride;
   (b) then, in order to reduce the time required to convert trisodium aluminum hexahydride to sodium aluminum tetrahydride, reducing the temperature to about 100° C. while continuing the hydrogen at pressure so as to increase the reaction rate compared to the reaction rate at about 140° C.

23. The process of claim 22 wherein the aluminum reactant contains a reaction-promoting quantity of a metal selected from titanium, zirconium, hafnium, vanadium, niobium, or uranium.

24. The process of claim 23 wherein the selected metal is titanium.

25. The process of claim 24 wherein the reaction promoting amount is about 1900 parts by weight per million parts aluminum.

* * * * *

UNITED STATES PATENT AND TRADEMARK OFFICE
CERTIFICATE OF CORRECTION

PATENT NO. : 4,512,966

DATED : APRIL 23, 1985

INVENTOR(S) : GUNNER E. NELSON

It is certified that error appears in the above-identified patent and that said Letters Patent is hereby corrected as shown below:

Column 6, line 36, reads "$Na(CH_3CH_2)_3AlH_2$" and should read -- $Na(CH_3CH_2)_2AlH_2$ --.

Signed and Sealed this

First Day of October 1985

[SEAL]

Attest:

DONALD J. QUIGG

Attesting Officer

Commissioner of Patents and Trademarks—Designate